(12) United States Patent
Whitman et al.

(10) Patent No.: US 6,772,150 B1
(45) Date of Patent: Aug. 3, 2004

(54) SEARCH QUERY REFINEMENT USING RELATED SEARCH PHRASES

(75) Inventors: Ronald M. Whitman, Seattle, WA (US); Christopher L. Scofield, Seattle, WA (US)

(73) Assignee: Amazon.com, Inc., Seattle, WA (US)

( * ) Notice: Subject to any disclaimer, the term of this patent is extended or adjusted under 35 U.S.C. 154(b) by 327 days.

(21) Appl. No.: 09/532,230

(22) Filed: Mar. 22, 2000

Related U.S. Application Data
(60) Provisional application No. 60/170,151, filed on Dec. 10, 1999.

(51) Int. Cl.[7] ............................................. G06F 17/30
(52) U.S. Cl. ...................... 707/6; 707/2; 707/3; 707/5; 707/10; 707/104
(58) Field of Search ............................... 704/10; 707/2, 707/5, 4, 3, 104, 6, 10

(56) References Cited

U.S. PATENT DOCUMENTS

| | | | |
|---|---|---|---|
| 5,675,819 A | | 10/1997 | Schuetze ...................... 704/10 |
| 5,721,897 A | | 2/1998 | Rubinstein ...................... 707/2 |
| 5,787,422 A | | 7/1998 | Tukey et al. ...................... 707/5 |
| 5,794,233 A | | 8/1998 | Rubinstein ...................... 707/4 |
| 5,802,515 A | | 9/1998 | Adar et al. |
| 5,855,015 A | * | 12/1998 | Shoham .......................... 707/5 |
| 5,911,140 A | | 6/1999 | Tukey et al. ...................... 707/5 |
| 5,913,215 A | | 6/1999 | Rubinstein et al. ............ 707/10 |
| 5,920,856 A | * | 7/1999 | Syeda-Mahmood ............ 707/3 |
| 5,940,825 A | * | 8/1999 | Castelli et al. .................. 707/6 |
| 5,983,219 A | | 11/1999 | Danish et al. |
| 5,983,220 A | | 11/1999 | Schmitt |
| 5,987,446 A | | 11/1999 | Corey et al. |
| 6,006,225 A | * | 12/1999 | Bowman et al. ................ 707/5 |
| 6,032,145 A | * | 2/2000 | Beall et al. ...................... 707/5 |
| 6,101,503 A | * | 8/2000 | Cooper et al. ............... 707/104 |
| 6,175,829 B1 | * | 1/2001 | Li et al. .......................... 707/3 |
| 6,178,416 B1 | * | 1/2001 | Thompson et al. ............. 707/3 |
| 6,421,675 B1 | | 7/2002 | Ryan et al. .................. 707/100 |

FOREIGN PATENT DOCUMENTS

| | | |
|---|---|---|
| WO | WO 99/41694 | 8/1999 |
| WO | WO 99/45487 | 9/1999 |
| WO | WO 99/66427 | 12/1999 |
| WO | WO 00/04465 | 1/2000 |

OTHER PUBLICATIONS

Jewell et al., "Hierarchically searching the web for images", IEEE, Jul., 1999, pp. 296–300.*

International Search Report for PCT/US00/42576 (3 pages).

* cited by examiner

Primary Examiner—Thuy N. Pardo
(74) Attorney, Agent, or Firm—Knobbe, Martens, Olson & Bear LLP (57) ABSTRACT

A search engine system uses information about historical query submissions to a search engine to suggest previously-submitted, related search phrases to users. The related search phrases are preferably suggested based on a most recent set of query submission data (e.g., the last two weeks of submissions), and thus strongly reflect the current searching patterns or interests of users. The system is preferably implemented within a search engine used to locate items that are available for electronic purchase, but may be implemented within other types of search engines. In one embodiment, the related search phrases are scored and selected for display based at least in-part on an evaluation of the "usefulness" of each search phrase, as reflected by actions performed by prior users while viewing the corresponding search results.

48 Claims, 8 Drawing Sheets

FIG. 1 amazon.com  Book Search

Enter Author and/or Title

Author: [__________________________] ⟋210
  ⊙ Exact Name    ○ Last, First Name    ○ Start of Last Name Title: [__________________________] ⟋220
  ○ Exact Title    ⊙ Title Word(s)    ○ Start(s) of Title Words

[Search Now]  [Clear the Form]
230

Author Search Tips / Title Search Tips

---

Search by Subject

Subject: [__________________________] ⟋240
  ○ Exact Subject    ○ Start of Subject    ⊙ Subject Word(s)    ○ Start(s) of Subject Word(s)

[Search Now]  [Clear the Form]
250

Subject Search Tips

---

Other Search Methods:
ISBN, Publisher/Date, Quick Search

Amazon.com Home | Music Search | Your Account

FIG. 2

310 —
```
Friday, 13-Feb-98 02:23:52
User Identifier = 293847 19287
HTTP_REFERRER= http://www.amazon.com/book_search_page
PATH_INFO=/book_search
title = walking the dog
items_found = 2
spell_check = no
```

320 —
```
Friday, 13-Feb-98 02:24:11
User Identifier = 293847 19287
HTTP_REFERRER= http://www.amazon.com/book_search
PATH_INFO=/ISBN = 0553562614
```

330 —
```
Friday, 13-Feb-98 06:15:03
User Identifier = 54730543261
HTTP_REFERRER= http://www.amazon.com/music_search_page
PATH_INFO=/book_search
artist = this and that
items_found = 0
spell_check = no
```

340 —
```
Friday, 13-Feb-98 10:07:34
User Identifier = 027385918272
HTTP_REFERRER= http://www.amazon.com/book_search_page
PATH_INFO=/book_search
subject = outdoor traile
items_foud = 22
spell_check = yes
```

350 —
```
Friday, 13-Feb-98 11:20:18
User Identifier = 72589100344
HTTP_REFERRER= http://www.amazon.com/book_search_page
PATH_INFO=/book_search
subject = sea stars
items_found = 15
spell_check = no
```

SEARCH QUERY REFINEMENT USING RELATED SEARCH PHRASES

RELATED APPLICATIONS

This application claims the benefit of provisional appl. No. 60/170,151, filed Dec. 10, 1999.

BACKGROUND OF THE INVENTION

1. Field of Invention

This present invention relates to query processing, and more specifically relates to techniques for facilitating the process of refining search queries.

2. Description of Related Art

With the increased growth of the Internet and the World Wide Web, it is common for on-line users to utilize search engines to search for desired information. Many web sites permit users to perform searches to identify a small number of relevant items among a much larger domain of items. As an example, several web index sites permit users to search for particular web sties among known web sites. Similarly, many on-line merchants permit users to search for particular products among all of the products that can be purchased from the merchant.

In order to perform a search, a user submits a search query containing one or more query terms. The search query may also explicitly or implicitly identify a record field or segment to be searched, such as title, author, or subject classification of the item. For example, a user of an on-line bookstore may submit a title-field-restricted search query containing terms that the user believes appear within the title of a book. A query server program of the search engine processes the search query to identify any items that match the terms of the search query. The set of items identified by the query server program is referred to as a "query result." In the on-line bookstore example, the query result is a set of books that satisfy the query, and in the web index site example, the query result is a set of web sites or web pages. In some implementations the query result may include items that contain only a subset of the terms of the search query. In web-based implementations, the query result is typically presented to the user as a hypertextual listing of the located items.

If the scope of the search is large, the query result may contain hundreds, thousands, or even millions of items. If a user is performing the search in order to find a single item or a small set of items, conventional approaches to ordering the items within the query result often fail to place the sought item or items near the top of the query result. This deficiency often requires the user to read through many items in the query result before reaching the sought item.

Some search engines suggest related query terms to the user as part of the "search refinement" process. Through the search engine's user interface, the user can select one or more of these related terms to add to the query. The goal of this process is to produce a refined search query that more narrowly specifies the user's intended request. The related query terms can be generated by the search engine using the contents of the query result, such as by identifying the most frequently used terms within the located documents or other items.

SUMMARY OF THE INVENTION

The related query terms can also be generated by using query data that is based on historical query submissions to the search engine. A preferred scheme for generating and providing users with related query terms based on query data is disclosed in U.S. Appl. No. 09/145,360, filed Sep. 1, 1998, titled SYSTEM AND METHOD FOR REFINING SEARCH QUERIES which is incorporated herein by reference. In this scheme, relatedness between terms is determined based on the frequency of co-occurrence of terms within the same query. Although this scheme represents a significant improvement over prior methods, in certain circumstances, the related query terms may not accurately reflect historical query submissions. Thus, the related query terms do not always assist the user with refining the search query.

The present invention addresses this and other concerns by using information about historical query submissions to a search engine to suggest previously-submitted, related search phrases to users. The related search phrases are preferably suggested based on a most recent set of query submissions data (e.g., the last two weeks of submissions), and thus strongly reflect the current searching patterns or interests of users. The invention is preferably implemented within a search engine used to locate items that are available for electronic purchase, but may be implemented within other types of search engines.

In accordance with one aspect of the invention, a table generation component uses information about prior query submissions to generate a table or other data structure that links key terms to previously-submitted search phrases containing such key terms. These "related search phrases" are preferably selected for inclusion in the table using a scoring algorithm which scores the search phrases based on at least one of the following: (i) frequency of search phrase submission, (ii) number of matches found in response to search phrase submission; and (iii) actions performed by users with respect to search results of search phrase submission. In one embodiment, the scores are based solely on frequency of search phrase submission, not counting search phrases that produced a NULL query result. For each key term, the most highly scored N (e.g., 50) search phrases containing that key term are stored in the data structure for subsequent look up.

In one embodiment, each table entry (keyword and related search phrase list) is specific to a particular search field of the search engine. For example, in the context of a search engine used to locate book titles, the key term "computer" may have one list of related search phrases generated from submissions within a "subject" field, and another related search phrases list generated from submissions within a "title" field. In other embodiments, the invention may be implemented without regard to search field identity. In accordance with another aspect of the invention, when a user submits a search query, a query processing component uses the table to look up one or more related search phrases to suggest to the user as alternative queries. For single-term queries, this is preferably accomplished by looking up and displaying the most highly-scored related search phrases associated with the single term and its search field. For multiple term queries, the related search phrase lists associated with the multiple query terms may be appropriately combined, and the most highly scored search phrases then suggested from the combined list. In either case, each suggested search phrase is preferably presented on a search results screen as a respective link that can be selected by the user to submit the phrase as a substitute query.

BRIEF DESCRIPTION OF THE DRAWINGS

These and other features will now be described with reference to the drawings summarized below. These drawings and the associated description are provided to illustrate a preferred embodiment of the invention, and not to limit the scope of the invention.

Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENTS

A specific embodiment of the invention will now be described with reference to the drawings. This embodiment, and its various implementation-specific details, are set forth in order to illustrate, and not to limit, the invention. For example, it will be recognized that the invention may be implemented without providing all of the features and benefits set forth herein. The scope of the invention is defined only by the appended claims.

The present invention provides a search refinement system and method for generating related search phrases ("related phrases") using a history of search queries submitted to a search engine by a community of users. Briefly, the system generates search phrase data which reflects the frequency with which specific phrases containing key terms have been submitted to the search engine. The system uses the search phrase data in combination with the query term(s) entered by the user to recommend related search phrases for refining the query. The incorporation of such historical query information into the process tends to produce related search phrases that are frequently used by other users, and significantly increases the likelihood that these related search phrases will be helpful to the search refinement process. To further increase the likelihood that the related search phrases will be helpful, the search phrase data is preferably generated only from those historical query submissions that produced at least one match (i.e., submissions that produced a NULL query result are ignored).

As described below, the related search phrases may additionally or alternatively be selected for display based on other criteria. For example, the search phrases may be selected based on whether they have tended to produce viewing (click-through) events, purchase events, or other types of user actions that evidence the usefulness of the search phrase. In addition, the search phrases may be selected for display based on the number of search results items returned ("hits"), with search phrases that produce relatively small numbers of hits being favored.

In a preferred embodiment, the search phrase data is regenerated periodically from recent query submissions, such as by using the last M days of entries in a transaction log, and thus heavily reflects the current interests of users. As a result, the related search phrases suggested by the search engine tend to be search phrases that correspond to the most frequently searched items during the relevant time period. Thus, for example, in the context of a search engine of an on-line merchant, the search engine tends to suggest related search phrases that correspond to the current best-selling products. In one embodiment, the technique used to generate the related search phrases and present the related search phrases to the user guarantees that the modified query will not produce a NULL query result.

The search refinement methods of the invention may be implemented within any type of computer system that provides searching capabilities to a community of users. In addition, the method may be combined with other methods for suggesting search query refinements, such as methods which process the contents of located items.

A preferred web-based implementation of the search refinement system will now be described with reference to FIGS. 1-8. For purposes of illustration, the system is described herein in the context of a search engine that is used to assist customers of Amazon.com, Inc. in locating items (e.g., books, CDs, toys, auctions, etc.) from an on-line catalog. Throughout the description, reference will be made to various implementation-specific details of the Amazon.com implementation. These details are provided in order to fully illustrate a preferred embodiment of the invention, and not to limit the scope of the invention. The scope of the invention is set forth in the appended claims.

I. Overview of the Web Site and Search Engine

Figure 1:
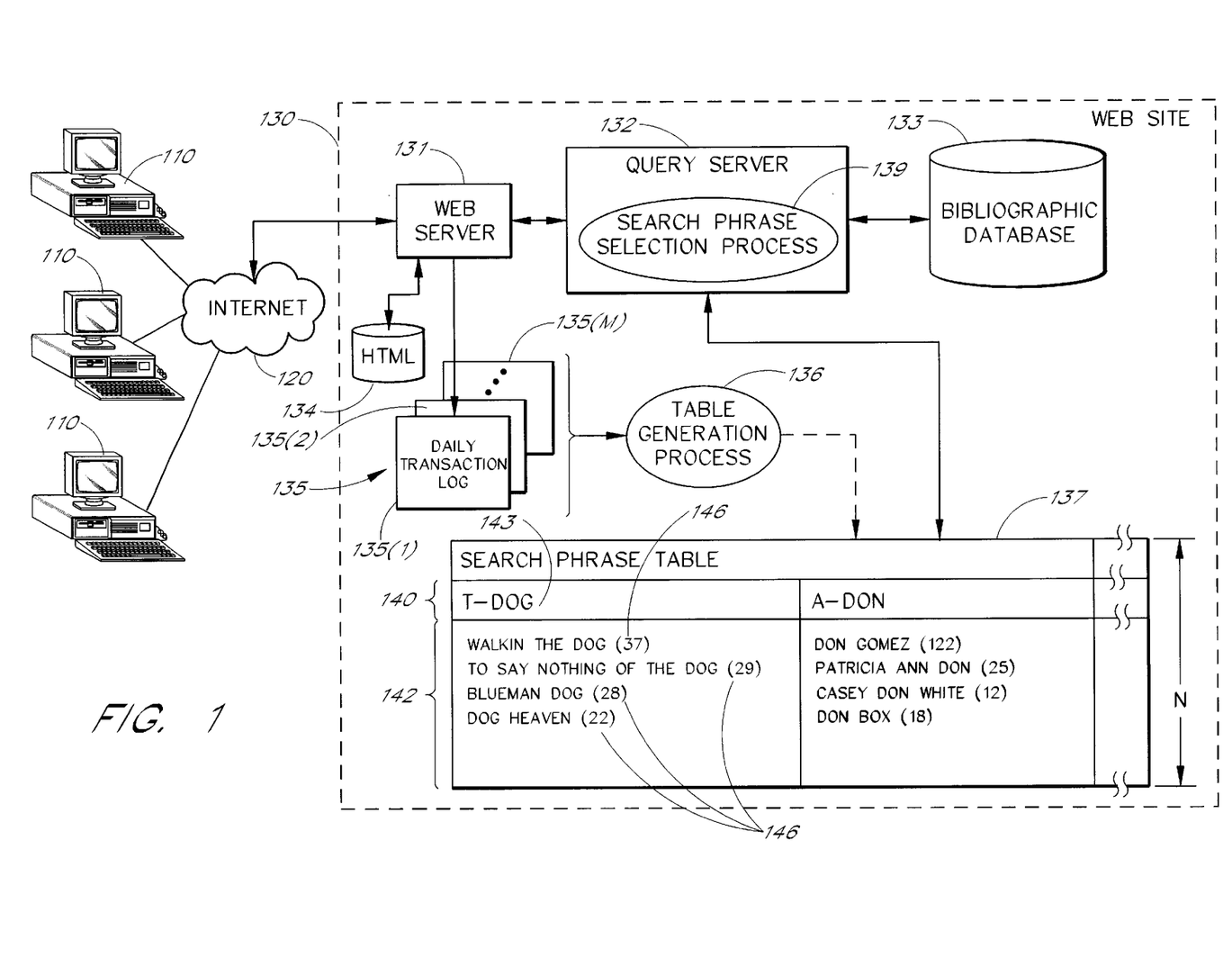
FIG. 1 illustrates a system in which users access web site information via the Internet, and illustrates the basic web site components used to implement a search engine which operates in accordance with the invention.

FIG. 1 illustrates the Amazon.com web site 130, including components used to implement a search engine in accordance with the invention. As it is well known in the art of Internet commerce, the Amazon.com web site includes functionality for allowing users to search, browse, and make purchases from an on-line catalog of book titles, music titles, auctions, and other types of items via the Internet 120. Because the catalog contains millions of items, it is important that the site provide an efficient mechanism for assisting users in locating items.

A. Web Site Components

As illustrated by FIG. 1, the web site 130 includes a web server application 131 ("web server") which processes user requests received from user computers 110 via the Internet 120. The user requests include search queries submitted by users to search the on-line catalog for products. In addition, the web server 131 preferably accesses a database 134 of HTML (Hypertext Markup Language) content which includes, among other things, web pages for performing various types of functions. Components that are not important to an understanding of the invention are omitted from FIG. 1.

The web server 131 preferably records the user transactions, including query submissions, within a transaction log 135. In the embodiment depicted in FIG. 1, the transaction log 135 consists of a sequence of daily transaction log files 135(1)–135(M), each of which represents one day of transactions. An off-line table generation process 136 uses the M most recent daily transaction log files 135(1)–135(M) to periodically generate the search phrase table 137.

A preferred general format of the search phrase table 137 is illustrated in FIG. 1 where each entry within the search phrase table 137 (two entries shown) has two primary components: a "key term" 140, and a "related search phrase list" 142 for that key term. Key terms are preferably all terms that may appear in a search query excluding single letter terms (e.g., I, A, T, F) and common words (e.g., the, to, at, in, if). Such terms are preferably excluded because they do not further the search refinement process. In other embodiments, such terms may be included. The related search phrase list 142 is preferably a list of the most highly ranked or scored search phrases that contain the corresponding key term. (As used herein, the term "phrase" refers to a combination of two or more terms.) As depicted in FIG. 1, the scores (shown in parenthesis) associated with specific search phrases may optionally be stored in the table 137. As further depicted by FIG. 1, each related search phrase 142 and key term 140 preferably include a single-character field prefix which indicates the search field to which the term corresponds. These prefixes may, for example, be as follows: A=author, T=title, S=subject, R=artist, L=label, B=general book; G=general item.

In the illustrated embodiment, each score is equal to the number of times the respective search phrase was submitted over a selected period of time (within the search field indicated by the respective field prefix), such as two weeks, ignoring queries that produced a NULL query result. Thus, for example, the related search phrase (including prefix) "t-walkin the dog" has a score 146 of twenty eight, indicating that twenty eight queries were received (during the time period to which the search phrase table 137 corresponds) which used the search phrase "walkin the dog" in the title field. Although the field prefixes and scores carry information which is useful to the related search phrase selection process (as described below), such information need not be preserved.

As described below, only the most highly scored N search phrases for a given key term/prefix pair are preferably included in the table 137. Thus, in the depicted embodiment, the related search phrase list 142 is a list of the N (e.g. 50) most frequently submitted search phrases that both contain the key term and produce at least one match. As with search phrases that produced a NULL query result, search phrases that produced too many matches (e.g., over 100) may be ignored, or accorded a lesser weight, to avoid suggesting search phrases that produce large query results.

Although the exemplary scores 146 for the related search phrases are based solely on frequency of search phrase occurrence in the illustrated embodiment, other types of criteria may additionally or alternatively be used. As mentioned above, such criteria may include, for example, the frequency with which the search phrase produced a user action indicative of a successful search, such as an item viewing event, an item purchase event, and/or other type of event that can be identified within a transaction log. In addition, the search phrases may be scored in-whole or in-part based on the number of hits produced, as reflected within the log, with search phrases that produced relatively small numbers of hits (but more than zero) being scored more highly. Information identified outside a transaction log may also be incorporated into the scoring process, such as available stock (e.g., surplus of goods), time of year (e.g., holiday-related goods), or promotion of specific events (e.g., the Olympics). For example, search phrases that have tended to produce purchases of items for which a surplus of stock currently exists, or for which the profit margin is relatively high, may be weighted more heavily.

Although the disclosed implementation uses a table to store the search phrase data, other types of data structures may be used.

The web site 130 also preferably includes a query server 132 which processes the queries by searching a bibliographic database 133. The bibliographic database 133 includes information about the various products that users may purchase through the web site 130. This information includes, for example, the titles, authors, publishers, subject descriptions, and ISBNs (International Standard Book Numbers) of book titles, and the titles, artists, labels, and music classifications of music titles. The information for each item is arranged within fields (such as an "author" field, a "title" field, a "general book" field), enabling the bibliographic database 133 to be searched on a field-restricted basis. The query server 132 may also search one or more additional database (not shown), such as a database of auctions, and databases associated with other merchants.

The query server 132 includes a related search phrase selection process 139 which selects related search phrases to suggest to the user based on the user's search query and the data stored a search phrase table 137. In accordance with the invention, the query server uses the search phrase table 137 to select the related search phrases that best match the user's query. The search engine then presents the related search phrases to the user for use as a refined or substitute query, allowing the user to modify the search and enhance discovery of relevant information. The suggested search phrases represent predictions of query refinements that, based on historical user actions, are likely to be helpful to the search process.

The web server 131, table generation process 136, query server 132, and database software preferably run on one or more Unix™-based servers and workstations (not shown) of the web site 130, although other types of platforms could be used. The search phrase table 137 is preferably cached in RAM (random access memory) on the same physical machine as that used to implement the query server 132. To accommodate large numbers of users, the query server 132 and the search phrase table 137 may be replicated across multiple machines. The web site components that are invoked during the searching process are collectively referred to herein as a "search engine."

B. Sample Web Page

Figure 2:
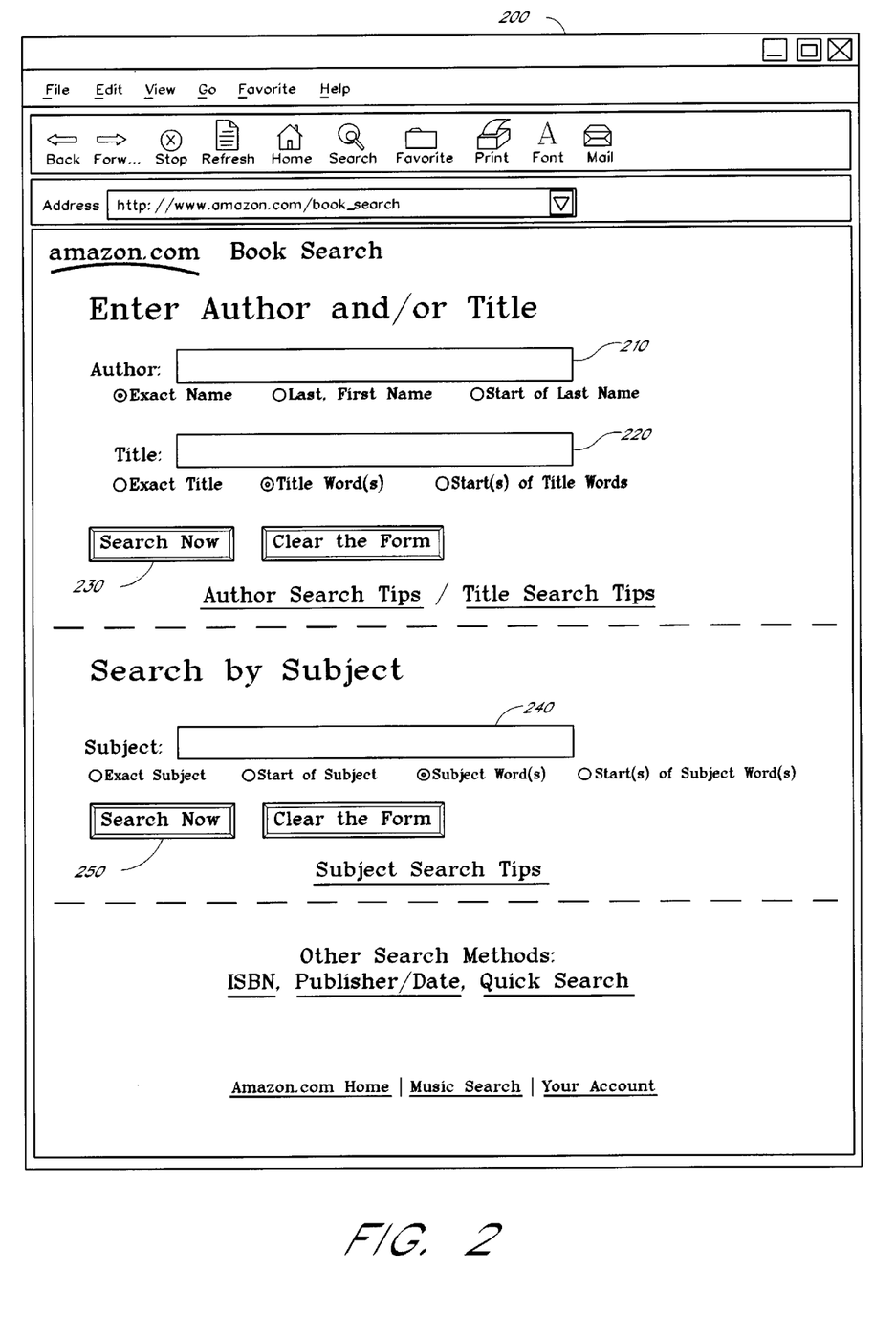
FIG. 2 illustrates a sample book search page of the search engine.

FIG. 2 illustrates the general format of a book search page 200 of the Amazon.com web site 130 that can be used to search the bibliographic database 133 for book titles. Users have access to other search pages that can be used to locate music titles and other types of items that are available for sale. The book search page 200 includes author, title, and subject fields 210, 220, 240 and associated controls that allow the user to initiate field-restricted searches for book titles. Users can perform searches by first typing in the desired information into a search field 210, 220, 240 and then clicking on the appropriate search button 230, 250. The term or string of terms submitted to the search engine is referred to herein as the "search query." Other areas of the web site allow the user to submit search queries without limiting the terms to specific fields.

C. Search Engine Operation

In operation, when a user submits a search query from the book search page 200 to the web site 130, the web server 131 passes the search query to the query server 132, and the query server 132 applies the search query to the bibliographic database 133, taking into account any field restrictions within the search query. For multiple-term search queries, the query server 132 effectively logically ANDs the query terms together before applying the search query to the bibliographic database 133. For example, if the user enters the terms "java" and "programming" into the title field 220, the query server 132 will search for and return a list of all items that have both of these terms within the title. Thus, if any query term does not produce a match (referred to herein as a "non-matching term"), the search query will produce a NULL query result. Presenting a NULL query result to the user can cause significant user frustration. To reduce this problem, in this event, the user may be presented with a list of items that are deemed to be "close matches." Although the search engine described herein logically ANDs the query terms together, it is recognized that the invention can be applied to search engines that use other methods for processing search queries.

If the query result contains no items (i.e., a NULL query result), the search query is preferably reviewed for any spelling errors and then reapplied to the bibliographic database. A preferred method for correcting spelling errors is disclosed in U.S. patent application Ser. No. 09/115,662 entitled "System and Method for Correcting Spelling Errors in Search Queries," filed Jul. 15, 1998, the disclosure of which is hereby incorporated by reference. If the corrected search query still returns no results, preferably an empty query result page is presented to the user with tips on how to improve the search query. Otherwise, if the query result contains only a single item, the item's information page is presented to the user.

If, however, the query result contains more than one item, a list of the items is preferably presented to the user through a query result page which contains hypertextual links to the items' respective information pages. The disclosed search engine also preferably uses historical query submissions and item selections to rank query results for presentation to the user. A preferred method for ranking query results based on such data is disclosed in U.S. patent application Ser. No. 09/041,081 filed Mar. 10, 1998, the disclosure of which is hereby incorporated by reference. In addition to presenting the user with the list of items, if the number of items found exceeds a certain threshold (e.g., 50), the query server 132 invokes its related search phrase selection process ("selection process") 139 to attempt to identify one or more related search phrases to suggest to the user. The selection process may alternatively be invoked without regard to whether a certain item count has been reached. In one embodiment, the selection process 139 is invoked only for single-term queries.

For each key term in the search query, the search phrase selection process 139 retrieves the respective related search phrase list 142 (if any) from the search phrase table 137; and if multiple lists result, it merges these lists together. In one embodiment, the related search phrase lists are combined by retaining only the intersecting related search phrases (search phrases which are common to all lists) and discarding all other search phrases. An important benefit of this method is that any related search phrase can be used as a search query without producing a NULL result, assuming that items within the bibliographic database have not been deleted or modified since the search phrase table 137 was last generated. In other embodiments, the search phrase lists may be combined by using other methods.

The selection process 139 then takes a predetermined number (e.g., 5) of the related search phrases with the highest scores, and passes these "suggested" related search phrases to the web server 131 with the query result. In one embodiment, the search phrase lists are sorted by score such that the search phrase with the highest score is at the top of the list. The operation of the selection process 139 is described in further detail below. Finally, the web server 131 generates and returns to the user a query result page (FIG. 8) which presents the suggested related search phrases to the user for selection. The related search phrases are preferably presented to the user as hyperlinks (as in FIG. 8) so the user can merely select the related search phrase to submit the new, modified query and avoid receiving a NULL result.

II. Capturing and Processing of Query Information

As indicated above, the table generation process ("generation process") 136 preferably generates the search phrase data from the transaction log 135 and stores the data in a search phrase table 137.

In a preferred embodiment, to assist in managing the large amount of query data, the transaction log 135 consists of a sequence of daily transaction log files 135(1)–135(M)(FIG. 1), each of which represents one day of transactions; and a table generation process 136 that is implemented as an off-line process which runs once a day using the M most recent daily transaction log files 135(1)–135(M) to generate periodically the search phrase table 137. Using a relatively small M (e.g., 5) tends to produce search phrase data that heavily reflects short term buying trends (e.g., new releases, weekly best-sellers, etc.), while using a larger M (e.g., 100) tends to produce a more comprehensive database. A hybrid approach can alternatively be used in which the search phrase table 137 is generated from a large number of log files, but in which the most recent log files are given greater weight. For example, search queries submitted during the last week may be counted three times when generating the scores 146, while search queries submitted from one week to one month ago may be counted only once. In addition, rather than using M consecutive days of query submissions, the generation process 136 may use samples of query submissions from multiple different time periods. Accordingly, it is recognized, that other generation processes could be used.

Figure 6:
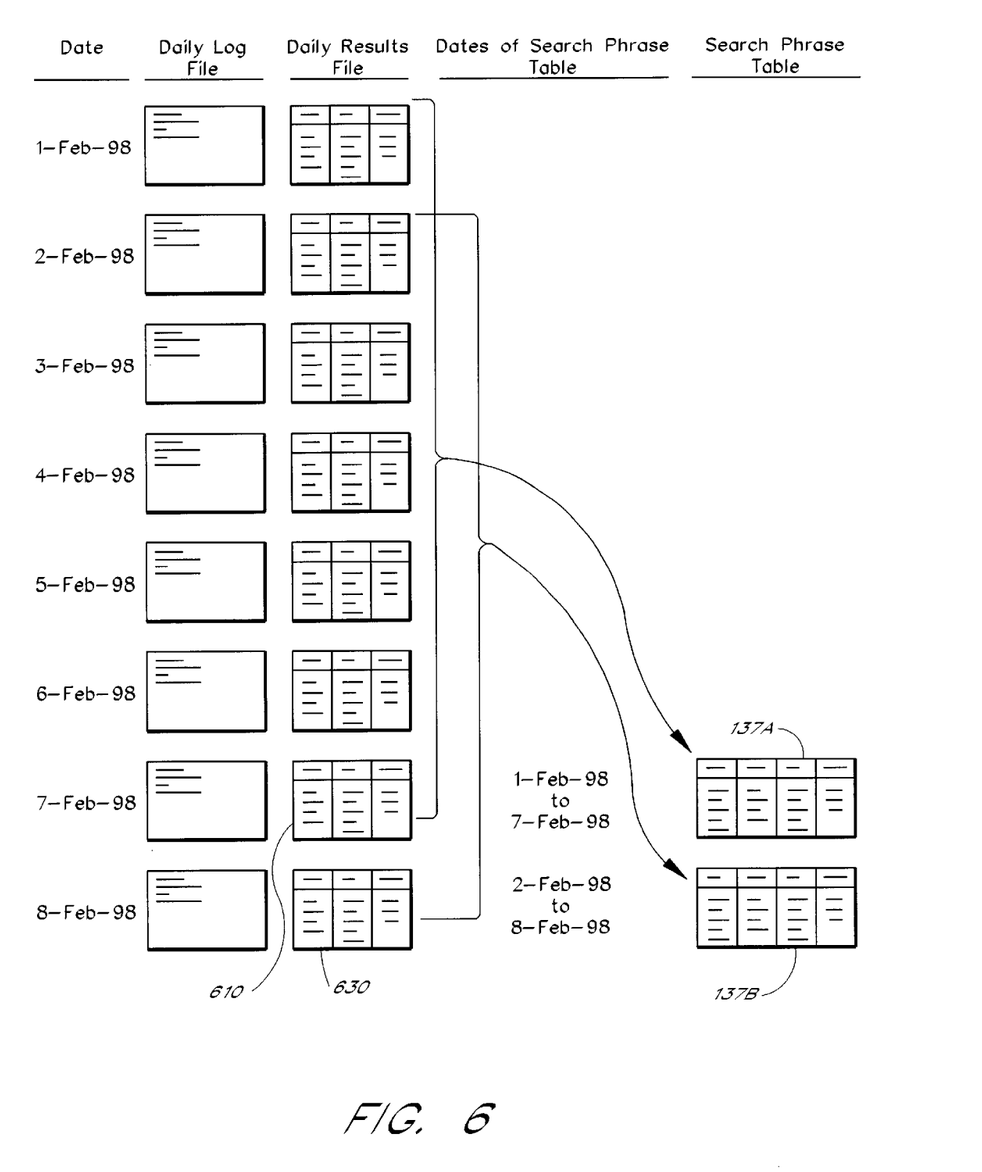
FIG. 6 illustrates a process for generating the search phrase table from the most recent daily transaction log files.

In a preferred embodiment, the building of the search phrase table 137 consists of two primary phases: (1) generating daily log files, and (2) periodically parsing and processing these log files to generate the search phrase table 137. These two phases are described separately below. Rather than generate new search phrase data each time log information becomes available, the generation process 136 preferably generates and maintains separate search phrase data for different constituent time periods of a relatively short length. In a preferred embodiment, the constituent time period is one day such that search phrase data for a single day is stored in a daily results file. Each time search phrase data is generated for a new constituent time period, the generation process 136 preferably combines this new data with existing data from earlier constituent time periods to form a collective search phrase table 137 with information covering a longer composite period of time. This process is depicted in FIG. 6 and is described further below.

Any of a variety of alternative methods could be used to generate the search phrase table 137. For example, the generation process 136 could alternatively be implemented to update the search phrase table 137 in real time in response to search phrase submissions. In addition, as noted above the generation process 136 and/or the search phrase selection process 139 could take into consideration other types of correlations, including extrinsic or "static" correlations that are not dependent upon the actions of users. Further, as mentioned above, other types of historical user activity data (e.g., whether a particular search phrase has tended to produce a positive response from users) as well as information identified separate from historical user activity data may be incorporated into the process.

A. Generating Daily Transaction log Files

A web server generally maintains a log file detailing all of the requests it has received from web browsers. The log file is generally organized chronologically and is made up of several entries, each entry containing information about a different request.

Figure 3:
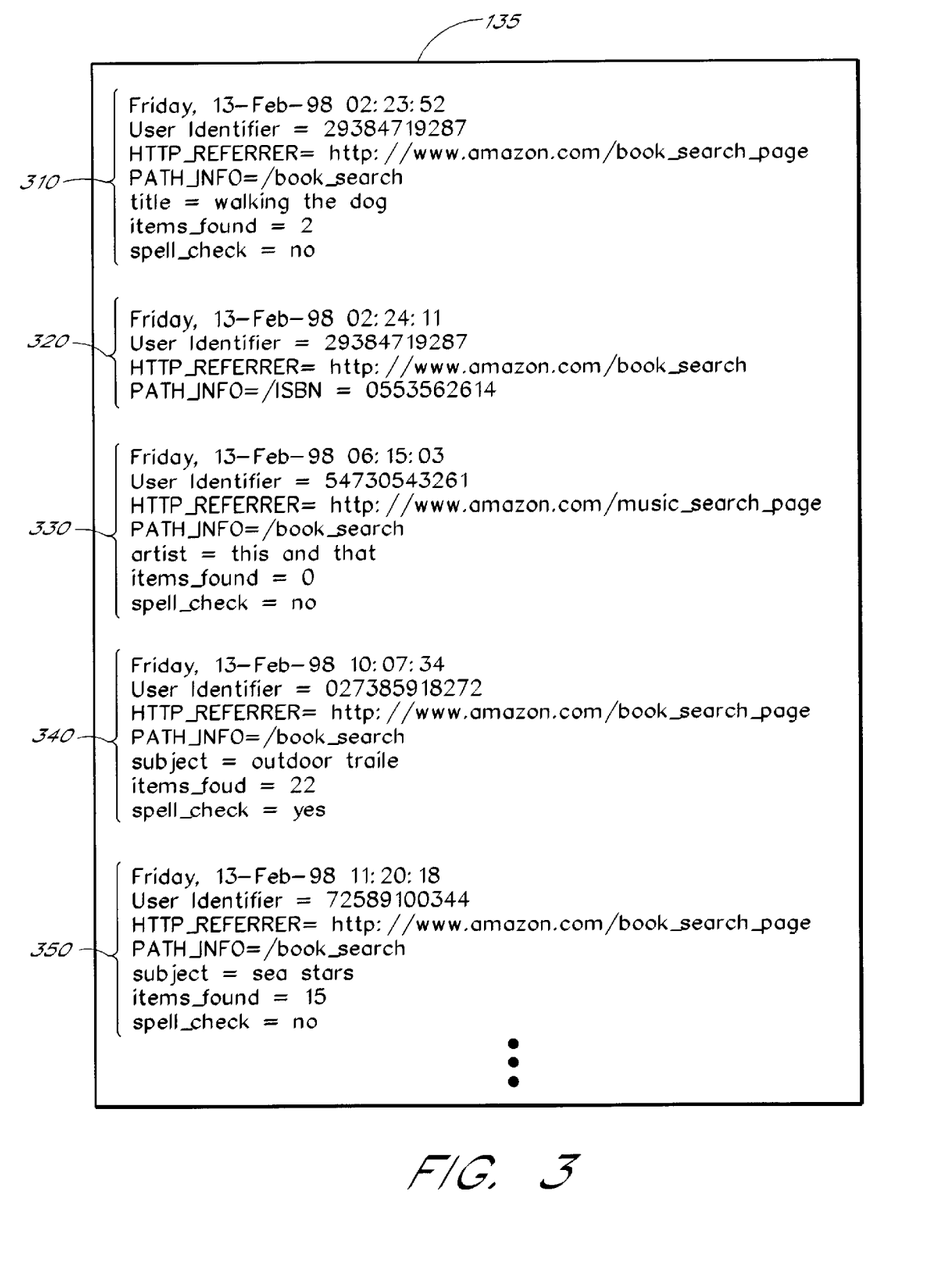
FIG. 3 illustrates sample log entries of a daily transaction log file.

In accordance with the invention, each time a user performs a search, the web server 131 stores information about the submitted search query in a log entry of a transaction log 135. In addition, the web server 131 preferably generates daily transaction log files 135(1)–135(M) which each contains the log entries for a respective day. FIG. 3 illustrates five log entries of a sample daily transaction log file 135. Each entry in the log file 135 includes information about a particular HTTP (Hypertext Transfer Protocol) transaction. The first log entry 310 contains date and time information for when the user submitted the search query, the user identifier corresponding to the identity of the user (and, in some embodiments, identification of the particular interaction with the web server), the name of the web page where the search query was entered, the search query entered by the user, the number of the items found for the search query, and an indication of whether the spell check feature was used to produce query results. The "items_found" values in the log preferably indicate the number items that exactly matched the search query.

For example, entry 310 indicates that at 2:23 AM on Feb. 13, 1998, user 29384719287 submitted the search query "walkin the dog" from the title field of the book search page and that two items were found that exactly matched the search query without use of the spell check feature. Entry 320 indicates that the same user selected an item having an ISBN of 0553562614 about twenty seconds later, and that this selection was made from a search results page (as is evident from the HTTP_REFERRER line). As mentioned above, this type of entry 320 may optionally be incorporated into the scoring process as an indication of the utility of the search phrase.

Other types of user actions, such as a request to place an item in a shopping cart or to purchase an item, are similarly reflected within the transaction log 135 and can likewise be incorporated into the scoring process. As indicated by the above example, a given user's navigation path can be determined by comparing entries within the transaction log 135.

B. Generating the Table

Figure 4:
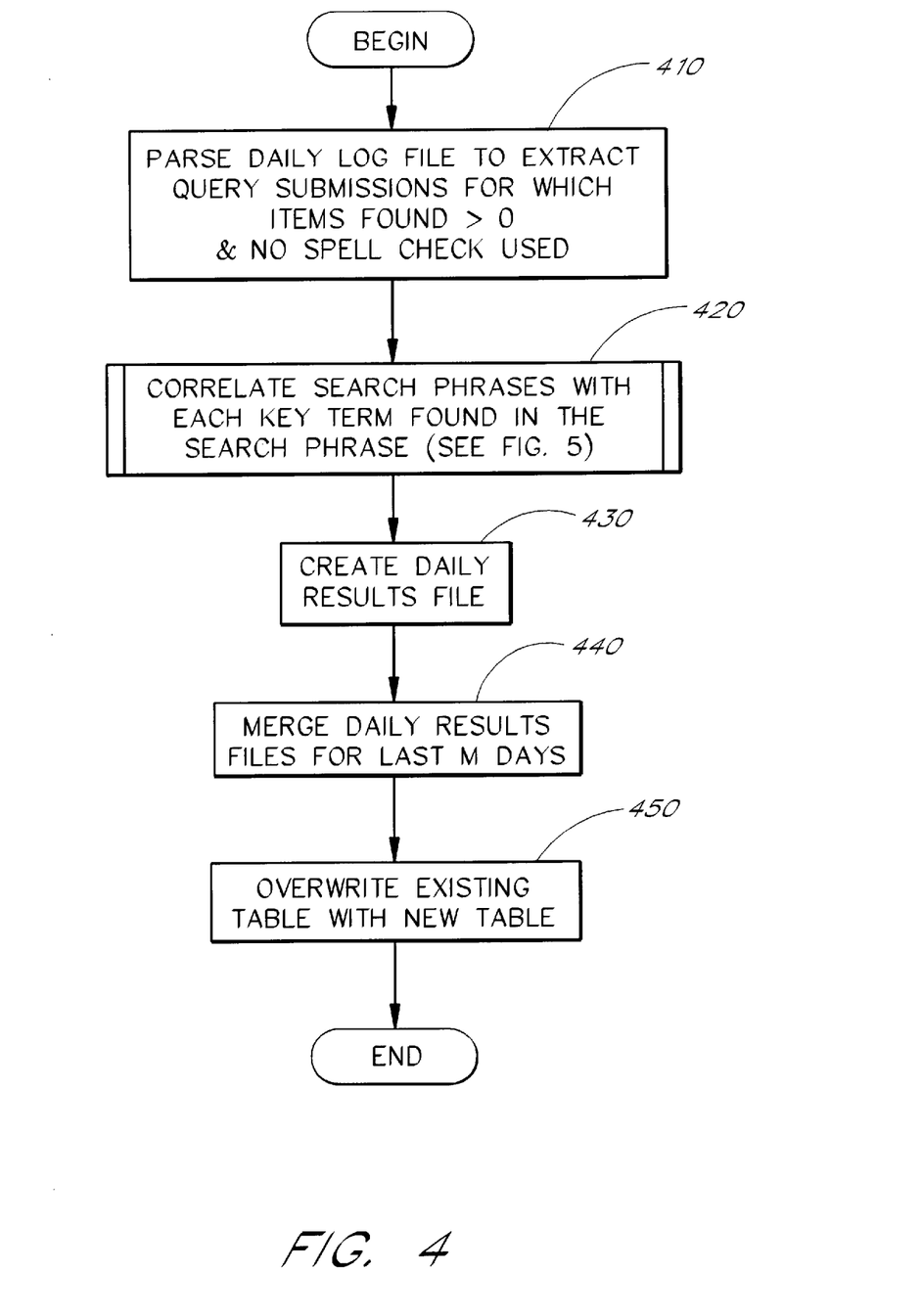
FIG. 4 illustrates the process used to generate the search phrase table of FIG. 1.

FIG. 4 shows a preferred method for generating the search phrase table 137. In step 410, the generation process 136 goes through the most recent daily transaction log file to identify all multi-term search queries (i.e., queries comprised of more than one term) that returned at least one item ("items_found" >0) in the query result and did not require the spell check feature. As noted above, search phrases that produced more than a threshold number of matches could also be ignored. In step 420, the generation process 136 correlates the identified search phrases with each key term of the search phrases and assigns the related search phrase a score 146. In the illustrated embodiment, the score indicates the number of times that the search phrase (containing the key term) has appeared during the period reflected by the daily transaction log. In step 430, the generation process 136 stores the related search phrases coupled with their scores in a daily results file. In step 440, the generation process 136 merges the daily results files for the last M days. Finally, in step 450, the generation process 136 creates a new table 137 and replaces the existing table.

In a preferred embodiment, the generation process 136 is executed once per day at midnight, just after the most recent daily transaction log is closed. In addition, it is assumed that the M−1 most recent daily transaction logs have already been processed by steps 410–430 of the process to generate respective daily results files.

Each of the steps 410–450 of the FIG. 4 process will now be described in greater detail.

Step 1: Process Daily Transaction Log File

As indicated above, the generation process 136 parses the daily transaction log file in step 410 to identify and extract multi-term search queries that produced at least one hit without requiring spelling correction. Ignoring the query submissions that produced a NULL query result (items_found=0) provides the important benefit of preventing unsuccessful search phrases from being added to the table. As described below, excluding such "unsuccessful" search phrases substantially guarantees that the modified query suggested to the user will produce at least one hit.

Using the FIG. 3 log sequence as an example, the generation process 136 would parse the sample daily transaction log file 135 beginning with log entry 310. The generation process 136 would extract the query for the first log entry 310 because the query contains more than one query term, "items_found" is greater than zero, and "spell_check" is set to NO. Next, the generation process 136 would ignore entry log 320 because it contains no query terms. The generation process 136 would then ignore log entry 330 because although there are multiple query terms, the number of items found is not greater than zero. The generation process 136 would next ignore log entry 340 because the query process had to use the spell check feature to find query results ("spell_check" =YES). The generation process 136 would then continue through the daily transaction log file 135. In some embodiments, other information such as query field or subsequent actions performed by the user may be used to determine which query submissions to extract or how heavily the search phrases should be weighted. In addition, other methods may be used to extract the information from the transaction log.

Step 2: Correlate Search Phrases with Key Terms

Figure 5:
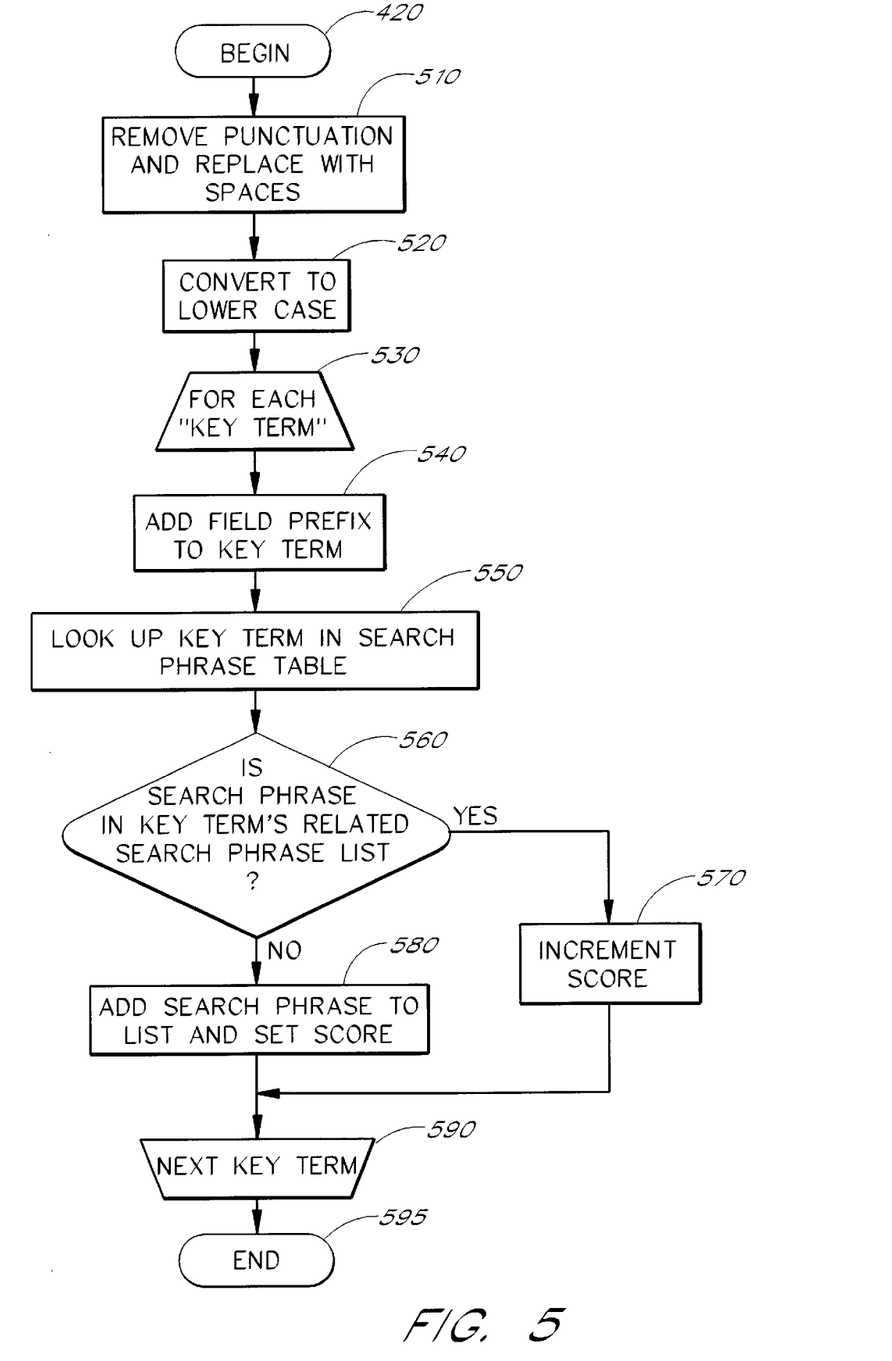
FIG. 5 illustrates a process for correlating a related search phrase with key terms.

FIG. 5 shows a preferred method for correlating the search phrases with the key terms. In step 510, the process preferably takes each extracted query and replaces any punctuation with spaces. In step 520, the process preferably converts the search query into lower case. Step 520 is used to recognize search queries that are essentially the same. For example, the process would treat the search query "mark twain" the same as the search query "Mark Twain." It is recognized that in other embodiments, punctuation and/or case information may alternatively be preserved.

Next, for each key term in the search query (steps 530, 590), the process first adds a single-character field prefix ("prefix") 143 to each key term indicating the search field in which the search query was entered (step 540) to create a key term/prefix pair. Thus, for example, using the prefixes listed above, the prefix "T" would be added to the terms "walkin" and "dog," in log entry 310, and the prefix "S" would be added to the terms "sea" and "stars," in log entry 350. If the search query was entered into the general book search field, the prefix "B" would be added to the search phrase. Next, in step 550, the process looks up the key term/prefix pair in the search phrase table to determine whether there already is an entry with the search phrase. If the search phrase already exists under the key term/prefix pair, the process increments the search phrase's score (step 570).

If, however, the search phrase is not in the table under the key term/prefix pair, then the process adds the search phrase with a default score (e.g., 1) (step 580). The process then repeats for each additional key term/prefix pair until all key terms in the search phrase have been traversed (steps 530, 590). Preferably, a score is maintained for each search phrase in the mapping to reflect how many times the search phrase appeared in the transaction log. The final values of the scores taken over M days are stored within the search phrase table 137 as scores 146 depicted in FIG. 1.

For example, if a user submits the search query "Rough Guide To London," in the title field 220, the search query would be converted to "rough guide to london."Next, the key terms would be coupled with the prefix "T" and the search phrase would be added to each key term/prefix pair or the scores for existing search phrase entries would be incremented. The scores for the mapping of the search phrase "rough guide to london" under "T-rough," "T-guide," and "T-london" would thus be created or incremented. Note that preferably; the term "to" would not have a mapping because it would not be deemed a "key term" since it is a common word.

In other embodiments, the search query may be correlated without reference to the search fields such that the prefix would not be added to the key terms. For example, the related search phrase list 142 for "mike" might include the search phrases "mike mulligan and his steam shovel," "mike davis," and "mike tyson" even though they were entered from the title field, the author field, and the search field respectively. Moreover, in other embodiments, a non-search field mapping or a generic mapping could be used in conjunction with the field restricted mapping.

In a preferred implementation, the mapping for a daily transaction log file is stored in a B-tree data structure. In other embodiments, a linked list, database, or other type of data structure can be used in place of the B-tree.

As a variation of the above-described method, the amount by which the scores are incremented in step 570 may be increased or decreased depending on different types of selection actions performed by the users on items identified in query results. These may include whether the user displayed additional information about an item, how much time the user spent viewing the additional information about the item, how many hyperlinks the user followed within the additional information about the item (or within the query result as a whole), whether the user added the item to a shopping basket, or whether the user ultimately purchased the item. For example, a given query submission may be counted twice (such as by incrementing the score by two) if the user subsequently selected an item from the query result page, and counted a third time if the user then purchased the item or added the item to a shopping basket. These and other types of post-search activities reflect the usefulness of the query result, and can be extracted from the transaction log 135 using well-known tracing methods. As indicated above, the increments may also be based on the number of items found, such that search phrases that produce large query results are accorded lesser weight.

Step 3: Create Daily Results File

Once the mapping is complete, that is, all entries in the daily transaction log file have been parsed, the generation process 136 creates a daily results file (step 430) to store the data preferably in a B-tree. In other embodiments, the daily results file may be generated at an earlier stage of the process, and may be incrementally updated as the parsing occurs.

Step 4: Merge Daily Results Files

In step 440, the generation process 136 generates the search phrase table 137 for a composite period by combining the entries of the daily results files for the length of the composite period. As depicted in FIG. 6, the table generation process 136 regenerates the search phrase table 137 on a daily basis from the M most recent daily results files, where M is a fixed number such as 10 or 20. Each day, the daily results file created in step 430 is merged with the last M-1 daily results files to produce the search phrase table 137

For example, in FIG. 6, suppose the generation process 136 generates a daily results file for 7-Feb-98 610 and is set to generate a new query table for the period of the last seven days (M=7). At the end of 7-Feb-98, the generation process 136 would merge the daily results files from the past seven days for the composite period of 1-Feb-98 to 7-Feb-98 to form a new search phrase table 137A. At the end of 8-Feb-98, the generation process 136 would generate a daily results file for 8-Feb-98 630 and then merge the daily results files from the past seven days for the composite period of 2-Feb-98 to 8-Feb-98 to form a new search phrase table 137B. When the entries are merged, the scores of the corresponding entries are combined, for example, by summing them. In one embodiment, the scores in more recent daily results files are weighted more heavily than those scores in less recent daily results files, so that the search phrase data more heavily reflects recent search query submissions over older search query submissions. This "sliding window" approach advantageously produces a search phrase table 137 that is based primarily on recent query submissions, and which thus reflects the current preferences of users.

For example, if a relatively large number of users have searched for the book *Into Thin Air* by Jon Krakauer over the past week, the correlations for the search phrases under the key term/prefix pairs "T-into," "T-thin," "T-air," "A-jon," and "A-krakauer"will likely be correspondingly high. Accordingly, the search phase "into thin air" will probably have a high score in the related search phases list 142 for "T-into," "T-thin,"and "T-air."

Step 5: Replace Old Search Phrase Table with New Search Phrase Table

In step 450, once the daily results files have been merged, the generation process 136 sorts the related search phrase lists from highest-to-lowest score. The generation process 136 then truncates the search phrase lists to a fixed length N (e.g., 50), if necessary, and stores the results in the table 137. The new search phrase table 137 is then cached in RAM (random access memory) in place of the existing search phrase table 137.

III. Using the Table to Select Related Search Phrases

Figure 8:
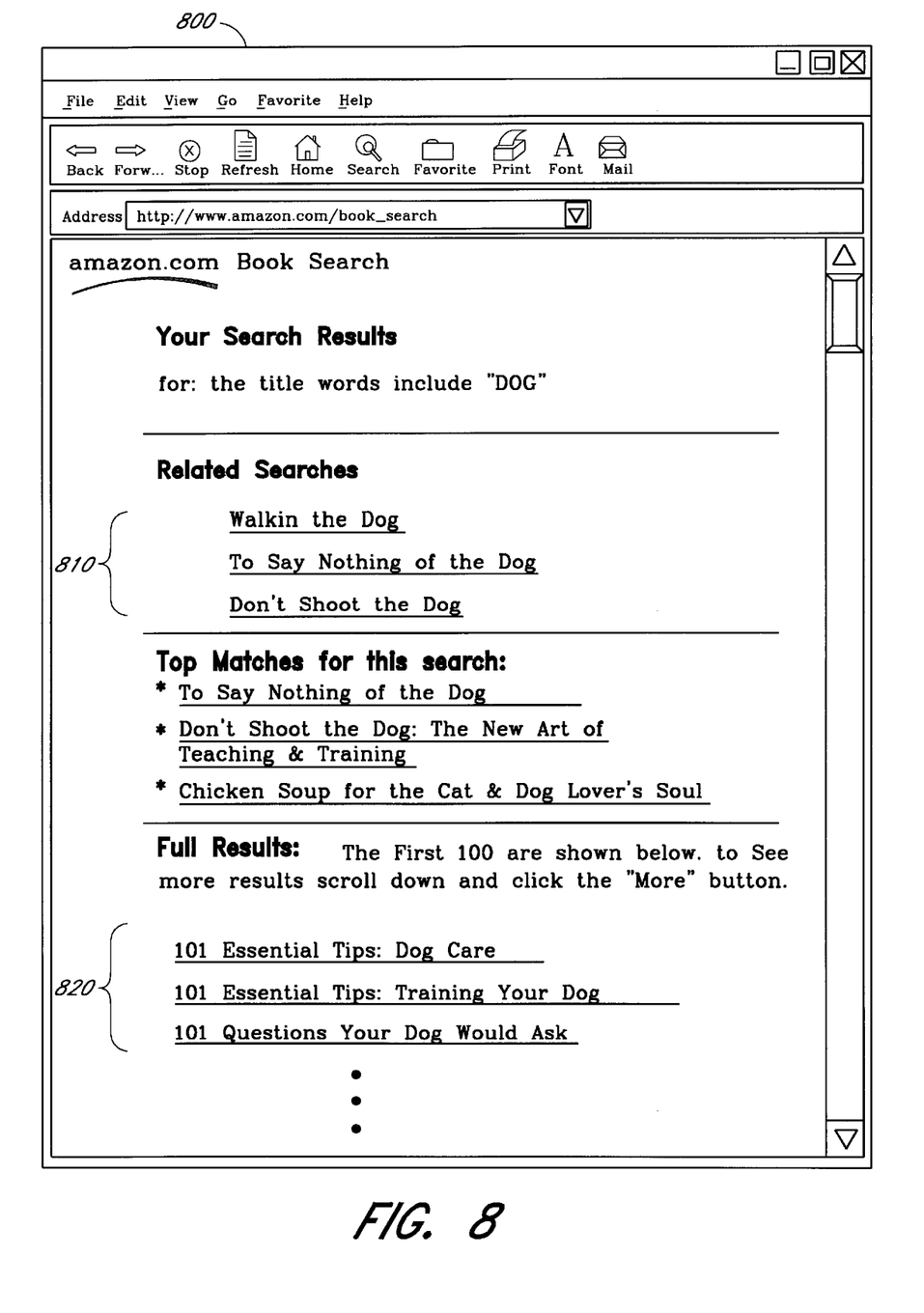
FIG. 8 illustrates a sample query results page of the search engine.

As indicated above, the query server 132 uses the search phrase table 137 to select related search phrases to be suggested to the user. More specifically, when a user performs a search which identifies more than a predetermined number of items, the search phrase selection process ("selection process") 139 returns a set of related search phrases selected from the search phrase table 137 and these phrases are presented to the user together with a query result list (FIG. 8). An important benefit of this method is that it is highly efficient, allowing the query result page to be returned without adding appreciable delay. Further, the small delay added by the search phrase selection process can be completely avoided by optionally generating the related search phrases concurrently with the search of the bibliographic database 133 (rather than waiting to see if a threshold item count is reached). As note above, in one embodiment, the selection process 139 is invoked only for single-term queries.

Figure 7:
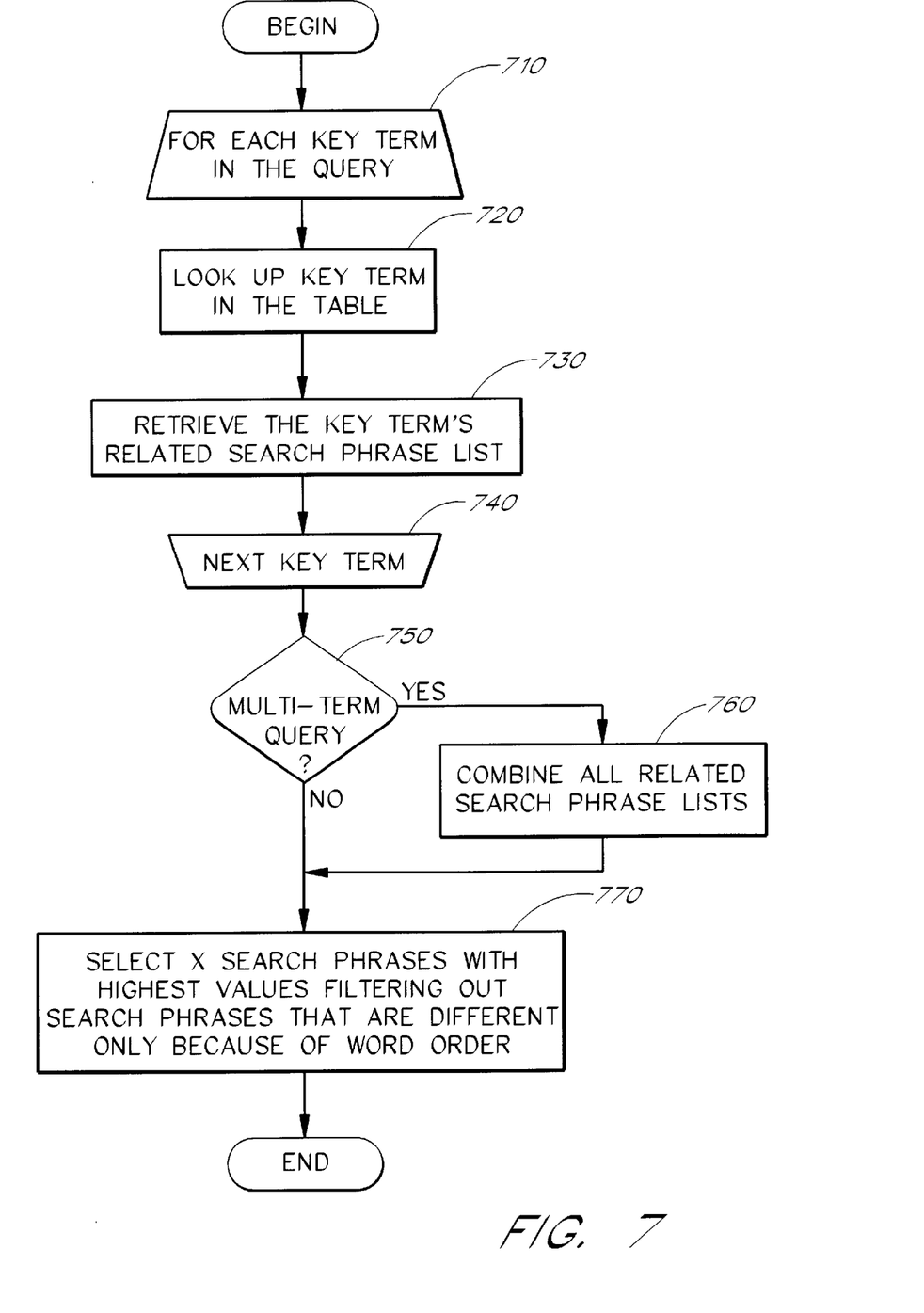
FIG. 7 illustrates a process for selecting related search phrases from the search phrase table.

FIG. 7 illustrates the sequence of steps performed by the selection process 139. The selection process 139 first enters a loop (steps 710–740) in which the selection process 139 looks up a key term in the search phrase table 137 and then retrieves the key term's related search phrase list 142. This continues for each key term in the search query. Next, if the search query has multiple key terms (step 750), the selection process 139 combines the related search phrase lists (step 760). The lists are preferably combined by taking the intersection of the related search phrase lists (i.e., deleting search phrases which do not appear in all lists) and summing the scores of the remaining search phrases. At this point, every search phrase which remains in the list is a search phrase which has appeared in at least one prior search query that produced one or more hits. Thus, assuming entries have not been deleted from or modified within the bibliographic database 133 since the beginning of the composite time period (the period to which the table 137 applies), none of these search phrases will produce a NULL query result. In other embodiments, the selection process 139 combines the related search phrase lists by summing the scores of search phrases common to other related search phrase lists, without deleting any search phrases. Another implementation might give weighted scores for intersecting key terms such that search phrases appearing in more than one related search phrase list are weighted more heavily than those search phrases appearing only in a single related search phrase list.

Next, the selection process 139 selects the X related search phrases with the highest values from the list (step 770), where X can be any desired number. In one embodiment, the selection process 139 filters out search phrases that are different only because of word order. This filtering can be done by sorting the search phrases alphabetically and removing duplicate phrases. For example, if the search query was "A-john" and both "john grisham" and "grisham john" appeared high in the combined list, the search phrase with the lower score would be removed.

For single-term queries, the selection process 139 thus retrieves the top X related search phrases from the table. For multiple-term queries, the selection process 139 obtains the related search phrase lists 142 for each of the key terms, and then takes the intersection of (or otherwise combines) these lists. The selection process 139 then displays the X intersecting terms with the X highest summed scores. If there are less than X intersecting, related search phrases, the selection process 139 may show only the intersecting related search phrases or it may use other criteria to generate the remaining related search phrases. For example, the selection process 139 could take the top Y search phrases with the highest summed scores from the non-intersecting related search phrases, although such related search phrases may not fully relate to the user's search query and may produce a NULL query result.

As indicated above, the method can alternatively be implemented without preserving or taking into account search field information. In addition, the method can be appropriately combined with other techniques for generating related search phrases, including techniques which use the contents of the query result.

IV. Presenting the Related Search Phrases to the User

There are a number of different ways to present the related search phrases to the user, including conventional methods such as check boxes and drop-down menus. In a preferred embodiment, the related search phrases are presented through hypertextual links which, when selected, cause the corresponding related search phrase to be submitted as a new search query. For example, if the user enters the search query "food" in the subject field, three additional hyperlinks may be displayed on the query result page, each of which generates a modified search when clicked on by the user. Each of these links is formed by displaying the top related search phrases from the related search phrase list of the key term/prefix pair "S-food." The three hyperlinks might be "food history," "organic baby food," and "raw food". When the user clicks on one of these links, the corresponding modified search query is submitted to the search engine. The method thus enables the user to select and submit the modified search query with a single action (e.g., one click of a mouse). As an inherent benefit of the above-described method of generating the related search phrases, each such link produces at least one "hit."

FIG. 8 illustrates a sample query result page 800 in which a user has performed a title field search for "dog" and has received a set of three related search phrases 810, each of which is incorporated into a respective hyperlink. The page will also typically contain a listing of the query result items 820. If the user clicks on the hyperlink "walkin the dog," the search engine will perform a search using the related search query "walking the dog" and will then return the associated items. The query result page 800 may also have search fields (not shown) for allowing the user to edit the suggested search phases prior to submission.

Any of a variety of additional techniques may be used in combination with this hyperlink-based interface. For example, in one embodiment, the query server 132 automatically selects the related search phrase at the top of related search phrase list (such as the term "walkin the dog" in the FIG. 8 example), and searches the query result to identify a subset of query result items that include this related search phrase. The query server 132 thereby effectively applies the "top" suggested modified search query to the bibliographic database 133. This process could be repeated using additional related search phrases in the list. The items within the subset can then be displayed to the user at the top of the query result, and/or can be displayed in highlighted form. Further, the query server 132 could cache the list of items that fall within the subset, so that if the user submits the modified query (such as by clicking on the link "walkin the dog" in FIG. 8), the query server could return the result of the modified search without having to search the bibliographic database. Special tags or codes could be embedded within the modified-query hyperlinks and passed to the web site 130 to enable the query server 132 to match the modified search queries to the cached results.

Although this invention has been described in terms of certain preferred embodiments, other embodiments that are apparent to those of ordinary skill in the art are also within the scope of this invention. Accordingly, the scope of the present invention is defined only by reference to the appended claims.

In the claims which follow, reference characters used to denote process steps are provided for convenience of description only, and not to imply a particular order for performing the steps.

What is claimed is:

1. A method of assisting users of a search engine in refining searches, comprising:
   (a) generating a log of actions, including query submissions, performed by users of the search engine;
   (b) selecting a subset of search phrases contained within the log based on at least one of the following: (i) frequency of search phrase submission, (ii) number of matches found in response to search phrase submission; and (iii) actions performed by users with respect to search results of search phrase submission;
   (c) storing the subset of the search phrases in a data structure for subsequent look-up;

(d) receiving a search query from a user, and using the search query to perform a search;

(e) identifying within the data structure at least one search phrase of the subset that is related to the search query; and (f) suggesting the at least one search phrase identified in (e) to the user for submission of a refined search query;

whereby actions of others, prior users of the search engine are used to assist the user in refining the search.

2. The method as in claim 1, wherein (b) comprises ignoring search phrase submissions that produced a NULL query result.

3. The method as in claim 1, wherein (b) comprises ignoring, or according a lesser weight to, search phrase submissions that produced more than a threshold number of matches.

4. The method as in claim 1, wherein (b) comprises determining whether users performed at least one of the following actions with respect to results of the search phrase submissions: (1) selected a search result item for viewing, (2) placed a search result item in a shopping cart, and (3) purchased a search result item.

5. The method as in claim 1, wherein (b) comprises generating, for each of a plurality of key terms, a ranked list of search phrases that contain the key term, and (c) comprises storing the ranked lists in the data structure.

6. The method as in claim 5, wherein the search query received in (d) contains only a single term, and (e) comprises using the single term as a key term to look up a corresponding list of related search phrases.

7. The method as in claim 5, wherein the search query received in (d) contains multiple terms, and (e) comprises retrieving from the data structure and combining multiple lists of related search phrases.

8. The method as in claim 1, further comprising repeating (b) periodically using a most-recent set of log data to produce a data structure that reflects current search activities of users.

9. A method of assisting users of a search engine in refining searches, comprising:

generating a data structure which links key terms to related search phrases based at least upon historical query submissions to the search engine from a plurality of users;

receiving a search query from a user;

using a search term of the search query as a key term to look up at least one related search phrase from the data structure; and suggesting the at least one related search phrase to the user for submission of a refined search query.

10. The method as in claim 9, wherein generating a data structure comprises selecting search phrases to include in the data structure based at least upon frequency of search phrase submission.

11. The method as in claim 10, wherein selecting search phrases based at least upon frequency of search phrase submission comprises ignoring search phrase submissions that produced a NULL query result.

12. The method as in claim 9, wherein generating a data structure comprises selecting search phrases to include in the data structure based at least upon actions performed by users in response to receiving search results.

13. The method as in claim 9, wherein generating a data structure comprises generating, for each of a plurality of key terms, a ranked list of search phrases that contain the key term.

14. The method as in claim 9, wherein the data structure is regenerated periodically using a most recent set of log data.

15. A method of identifying a set of search phrases to suggest to users of a search engine comprising:

(a) identifying a plurality of previously-submitted search phrases that contain a selected key term;

(b) ranking the plurality of search phrases based on at least one of the following: (i) frequency of search phrase submission, (ii) number of matches found in response to search phrase submission; and (iii) actions performed by users with respect to search results of search phrase submission; and (c) selecting a most highly ranked subset of the plurality of search phrases to suggest to users that perform searches containing the selected key term;

whereby the search phrases selected to suggest to users are dependent upon actions performed by other users of the search engine.

16. The method as in claim 15, further comprising repeating (a)–(c) for each of a plurality of additional key terms, and storing results of (c) in a data structure for subsequent look up.

17. A system for assisting users of a search engine in refining search queries, comprising:

a data structure that links key terms to previously-submitted search phrases containing the respective key terms based on at least one of the following: (i) frequency of search phrase submission, (ii) number of matches found in response to search phrase submission; and (iii) actions performed by users with respect to search results of search phrase submission; and a query processing component that uses the data structure to look up and suggest search phrases to users based on current query submissions of such users, whereby actions of prior users of the search engine are used to assist current users of the search engine in refining searches.

18. The system as in claim 17, further comprising an executable component that generates the data structure using data contained with a transaction log.

19. The system as in claim 18, wherein the executable component regenerates the data structure periodically using a most recent set of transaction log data.

20. The system as in claim 18, wherein the executable component generates, for each of a plurality of key terms, a ranked list of search phrases that contain the key term.

21. The system as in claim 18, wherein the executable component ignores search phrase submissions that produced a NULL query result.

22. In a computer system that implements a search engine in which related search phrases are suggested to users to facilitate interactive refinement of search queries, a system for generating related search phrases, comprising:

a first component which generates a data structure that links key terms to related search phrases based at least in-part upon frequency of occurrences of search phrases within historical query submissions of a plurality of users; and a second component which uses the data structure in combination with a search query submitted by a user to select related phrases to suggest to the user.

23. The system of claim 22, wherein the first component ignores query submissions that produced NULL query results.

24. The system of claim 17, wherein the data structure links key terms to previously-submitted search phrases containing the respective key terms based at least in-part on said actions performed by users with respect to search results of search phrase submission.

25. The system of claim 24, wherein said actions performed with respect to search results include selecting a search result item for viewing.

26. The system of claim 24, wherein the actions performed with respect to search results include adding a search result item to a shopping cart.

27. The system of claim 24, wherein the actions performed with respect to search results include purchasing a search result item.

28. A method of assisting a user in conducting a search, the method comprising:

receiving a search query specified by the user;

identifying a key term in the search query;

selecting a previously-submitted search phrase which contains the key term, such that selection of the search phrase takes into consideration a usefulness of the search phase as reflected by post-search actions performed by other users who submitted the search phrase; and suggesting the search phrase to the user for conducting a refined search.

29. The method as in claim 28, wherein suggesting the search phrase comprises displaying the search phrase together with a query result of the search query specified by the user.

30. The method of claim 28, wherein the post-search actions include selecting a query result item for viewing.

31. The method of claim 28, wherein the post-search actions include adding a query result item to a shopping cart.

32. The method of claim 28, wherein the post-search actions include purchasing a query result item.

33. The method of claim 28, wherein selecting the previously-submitted search phrase comprises analyzing a transaction log in an off-line mode, prior to receiving the search query from the user, the transaction log reflecting search activities performed by a plurality of users over a period of time.

34. The method of claim 28, wherein selecting the previously-submitted search phrase further takes into consideration a usefulness of the search phase as reflected by a size of a query result from prior submissions of the search phrase.

35. The method of claim 28, wherein selecting the previously-submitted search phrase further takes into consideration a frequency with which the search phrase has been submitted over a period of time.

36. A method of assisting a user in conducting a search, the method comprising:

receiving a search query specified by the user;

identifying a term in the search query;

identifying a previously-submitted search phrase which contains the term and which, based at least in-part on an automated analysis of post-search actions performed by users who previously submitted the search phrase, is deemed to produce a useful query result; and suggesting the previously-submitted search phrase to the user for submission of a refined search query;

whereby prior actions performed by other users assist the user in refining the search.

37. The method as in claim 36, wherein suggesting the search phrase comprises displaying the search phrase together with a query result of the search query specified by the user.

38. The method of claim 36, wherein the post-search actions include selecting a query result item for viewing.

39. The method of claim 36, wherein the post-search actions include adding a query result item to a shopping cart.

40. The method of claim 36, wherein the post-search actions include purchasing a query result item.

41. The method of claim 36, further comprising performing the automated analysis of post-search actions.

42. The method of claim 41, wherein performing the automated analysis of post-search actions comprises processing a transaction log in an off-line processing mode, prior to receiving the search query from the user.

43. A system for assisting users in conducting searches of a database, comprising:

a first component which maintains a log reflecting search query submissions of a plurality of users and reflecting post-search actions performed by the users with respect to associated query result items;

a second component which selects search queries from the log and stores selected search queries in a data structure for subsequent look-up, wherein the second component selects a search query from the log based at least in-part on a usefulness of the search query as reflected by the post-search actions performed by users who submitted that search query; and a third component which is responsive to a search query submission of a user by selecting at least one related search query from the data structure, and suggesting the at least one related search query to the user;

whereby the system uses actions of prior users of the search engine to assist current users of the search engine in conducting searches.

44. The system of claim 43, wherein the data structure is a mapping structure which maps key words to search phrases.

45. The system of claim 43, wherein the second component selects a search query from the log based at least in-part on a frequency with which submitters of that search query have selected resulting query result items for viewing.

46. The system of claim 43, wherein the second component selects a search query from the log based at least in-part on a frequency with which submitters of that search query have selected resulting query result items for purchase.

47. The system of claim 43, wherein the second component selects a search query from the log based further on a frequency with which the search query has been submitted, as reflected in the log.

48. The system of claim 43, wherein the second component runs in an off-line processing mode.

* * * * *

UNITED STATES PATENT AND TRADEMARK OFFICE
CERTIFICATE OF CORRECTION

PATENT NO. : 6,772,150 B1
DATED : August 3, 2004
INVENTOR(S) : Whitman et al.

It is certified that error appears in the above-identified patent and that said Letters Patent is hereby corrected as shown below:

Column 11,
Line 11, insert a space before "Next".
Line 18, replace "preferably;" with -- preferably, --.

Column 15,
Line 8, replace "others," with -- other, --.

Column 16,
Line 5, after "engine" insert -- , --.

Column 17,
Lines 21 and 44, replace "phase" with -- phrase --.

Signed and Sealed this

Sixth Day of June, 2006

JON W. DUDAS
*Director of the United States Patent and Trademark Office*